J. H. LATIMER.
Hand-Seeder.

No. 60,200.

Patented Dec. 4. 1866

United States Patent Office.

IMPROVEMENT IN HAND SEED PLANTER.

JOHN H. LATIMER, OF CRYSTAL LAKE, ILLINOIS.

Letters Patent No. 60,200, dated December 4, 1866.

SPECIFICATION.

TO ALL WHOM IT MAY CONCERN:

Be it known that I, JOHN H. LATIMER, of Crystal Lake, in the county of McHenry, and State of Illinois, have invented a new and useful Improved Hand Seed Planter; and I do hereby declare and make known that the following is a full, clear, and exact description of the same, reference being had to the accompanying drawings, and the letters and figures marked thereon, which form part of this specification.

My said invention consists in an implement for planting seeds, to be operated by hand, of novel construction, whereby two different kinds of seeds, as corn and pumpkin seeds, may be planted from separate receptacles at the same time, and which by ready adjustment can be adapted to seeds of different kinds and sizes, and also to different kinds of soil, so that the various seeds may be deposited and planted at the proper depth in the soil.

To enable those skilled in the art to understand how to make and use my invention, I will proceed to describe its construction and operation with particularity, making reference, in so doing, to the aforesaid drawings, in which—

Similar letters of reference in the several figures denote the same parts of my invention.

Figure 1:
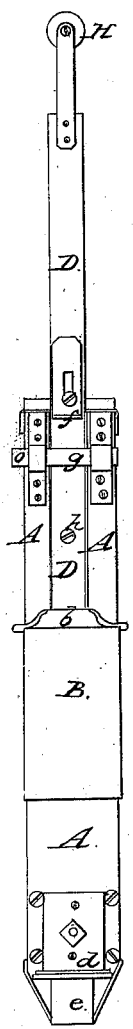
Figure 1 represents a front elevation of my invention.
Figure 2:
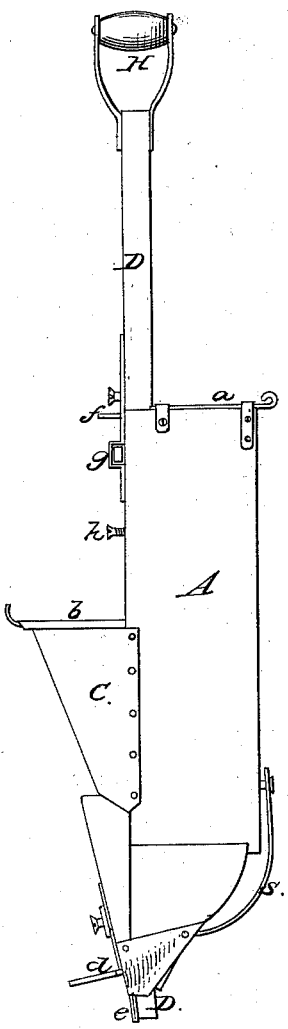
Figure 2 is a side elevation of the same.
Figure 3:
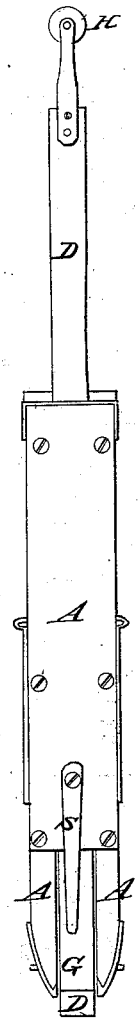
Figure 3 shows a rear elevation thereof.
Figure 4:
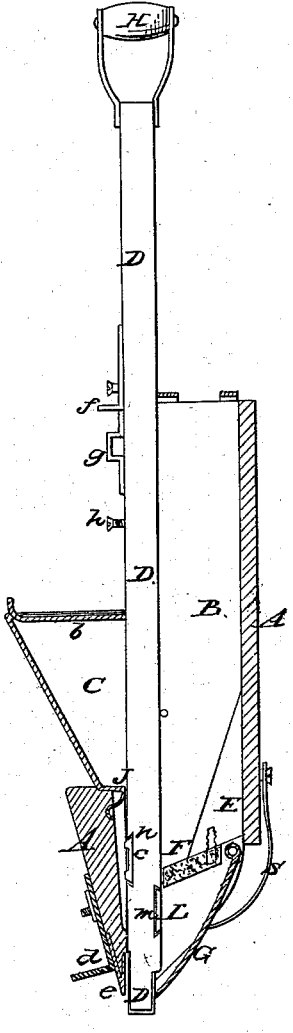
Figure 4 is a side central sectional view of the same.

A represents a longitudinal box or case intended to be held in a vertical position, containing a seed chamber, B, provided with a slide cover a, and having attached thereto, as shown, a second chamber, C, provided with a similar sliding cover b, as shown in the drawings. Between the said chambers, and separating them from each other, is arranged a vertical reciprocating sliding rod or bar, D, provided with a handle H and an adjustable gauge f, which, striking upon the stationary bar g, prevents a too great descent through the casing A, when the said bar D is thrust downward, as hereinafter mentioned. There is also a stop h upon said bar D, below the cross-bar g, to prevent the said sliding bar from being withdrawn from the apparatus when lifted up. In the lower part of the chamber B, as shown, there is a block E arranged, forming an inclined bottom to said chamber, extending nearly across the chamber to the slide D, to the edge of which block is attached a strip of rubber, or its equivalent, which presses against said bar D sufficiently to close the chamber B, but which, nevertheless, allows said slide to more freely in contact therewith. A similar and equivalent provision is made in the bottom of the second seed chamber, marked C. Below the said chambers B C, at the lower end of the apparatus, is a third chamber, L, as shown, its rear wall, G, being pivoted at its upper end, and held against the front wall of the said chamber by the action of the spring S, which allows said hinged wall or door to yield back far enough to allow the slide D to pass down between, as clearly shown in fig. 4. In the front and rear faces of the said slide D are made suitable grooves to receive removable seed receptacles of various capacities, so as to adapt the machine to various kinds of seeds, which are shown at m c, in fig. 4. For small seeds the receptacle may be simply a recess in the face of the slide, as m, or for the larger seeds the receptacle may have a projecting lip or flange, as c. At the point, e, of the machine which is thrust into the soil to form the hole into which the seed is placed, as hereinafter mentioned, and upon the front of the implement, is an adjustable gauge d, which regulates the depth at which the seed is planted, and which may be adjusted so as to adapt the planter to different kinds of seed or grain which require to be planted at different depths.

Having described the construction of my invention, I will now describe its operation. If desired to plant two kinds of seed, as corn and pumpkin seeds, as is very frequently done, in the same hill, the corn is placed in the chamber B and the pumpkin seeds in the chamber C, the seed-carriers, m and c, being regulated so that they shall carry down the proper or desired quantity of seed, as aforesaid, and the gauge d being adjusted so as to allow the point e enter the ground to the proper depth, and the gauge f being adjusted so as to allow the lower end of the bar D to pass down to the point e, as shown. By allowing the point e to fall heavily upon the ground, it will enter the same, as far as permitted by the gauge d, when, by thrusting down the bar D, enough corn for a hill and a pumpkin seed or more are carried down into the chamber L, so that when the slide D is drawn back the lower end of G is thrown against the front of the chamber L by the spring S, closing the chamber and retaining the seeds aforesaid therein lying at the bottom of the chamber, so that the succeeding thrust of the slide D forces the seeds out through the opening thus formed into the ground as desired, at the same time carrying down seed for another hill. After the first hill is planted each thrust of the slide deposits a hill in the ground and leaves seed for the next hill in the chamber L. If only one kind of seed is planted, it may be placed in either chamber, having an appropriate seed box or carrier arranged in the slide, the capacity thereof varying for the various kinds of seed.

Having described the construction and operation of my invention, I will now specify what I claim and desire to secure by Letters Patent.

1. I claim a seed planter, provided with one or two chambers B C, and a chamber L provided with a hinged bottom G, and a spring S, or its equivalent, arranged with a slide D, provided with one or more seed-cavities, $m\ c$, operating substantially in the manner and for the purposes specified.

2. In combination with the above, I claim the arrangement of the gauges $d\ f$, and the point $e$, as and for the purposes specified.

3. I claim providing the chamber L with the hinged bottom G, and a spring S, substantially as and for the purposes set forth.

JOHN H. LATIMER.

Witnesses:
ABNER CALKINS,
DORUS CALKINS.